US006269757B1

(12) United States Patent
Kiest (10) Patent No.: US 6,269,757 B1
(45) Date of Patent: Aug. 7, 2001

(54) METHOD AND APPARATUS FOR DELIVERING FERTILIZER TO THE SOIL

(76) Inventor: Lauren J. Kiest, 287 Garfield St., Denver, CO (US) 80206

( * ) Notice: Subject to any disclaimer, the term of this patent is extended or adjusted under 35 U.S.C. 154(b) by 0 days.

(21) Appl. No.: 09/632,145

(22) Filed: Aug. 3, 2000

(51) Int. Cl.[7] .................................................. A01C 23/02
(52) U.S. Cl. ............................................ 111/119; 111/900
(58) Field of Search ............................ 111/118, 119, 127, 111/900

(56) References Cited

U.S. PATENT DOCUMENTS

| T101,901 | 6/1982 | Achorn et al. ............................ 71/36 |
| 3,947,574 | 3/1976 | Jaggers et al. ....................... 424/127 |
| 3,950,401 | 4/1976 | Petrille et al. ................... 260/504 R |
| 3,954,942 | 5/1976 | Achorn et al. ........................ 423/313 |
| 3,978,681 | 9/1976 | Kjelgaard et al. ........................ 62/51 |
| 3,990,662 | 11/1976 | Wallace . | |

(List continued on next page.)

OTHER PUBLICATIONS

DMI, Inc., Brochure: Quality Applicator Accessories Expand Your Applications, no date.

DMI, Inc., Brochure: nutri–plac'r Fertilizer Applicators, no date.

DMI, Inc., Brochure: nutri–plac'r Pull–Type Fertilizer Applicators, no date.

*Primary Examiner*—Christopher J. Novosad
(74) *Attorney, Agent, or Firm*—Dorsey & Whitney LLP (57) ABSTRACT

A method and apparatus for delivering agricultural fertilizer, such as anhydrous ammonia, uniformly into the soil includes an applicator frame on which a plurality of soil-cutting knives are suspended, a supply tank of the fertilizer, a heat exchanger for cooling the fertilizer to a predetermined temperature, with the coolant being delivered to the heat exchanger from an externally powered refrigeration unit, a distribution manifold for receiving the cooled fertilizer from the heat exchanger and a plurality of distribution hoses connecting the distributor individually to the knife blades and the emission nozzles associated therewith.

23 Claims, 6 Drawing Sheets

U.S. PATENT DOCUMENTS

| | | | |
|---|---|---|---|
| 4,007,029 | 2/1977 | Kenton | 71/11 |
| 4,062,306 | 12/1977 | Wosmek | 111/7 |
| 4,064,276 | 12/1977 | Conradsen et al. | 426/69 |
| 4,069,029 | 1/1978 | Hudson | 62/51 |
| 4,079,680 | 3/1978 | Davis | 111/7 |
| 4,090,979 | 5/1978 | Ogren et al. | 252/441 |
| 4,101,557 | 7/1978 | Mueller et al. | 260/327 E |
| 4,141,676 | 2/1979 | Jannen et al. | 417/539 |
| 4,175,394 | 11/1979 | Wiesboeck | 62/51 |
| 4,228,637 | 10/1980 | Richey et al. | 56/341 |
| 4,241,989 | 12/1980 | Jackson et al. | 354/299 |
| 4,308,247 | 12/1981 | Horton et al. | 423/574 R |
| 4,309,244 | 1/1982 | Tworek et al. | 162/102 |
| 4,310,344 | 1/1982 | Kjelgaard et al. | 71/61 |
| 4,310,555 | 1/1982 | Kjelgaard et al. | 426/69 |
| 4,365,988 | 12/1982 | Graham et al. | 71/34 |
| 4,377,406 | 3/1983 | Achorn et al. | 71/36 |
| 4,385,500 | 5/1983 | Kjelgaard et al. | 62/51 |
| 4,432,651 | 2/1984 | McLeod | 366/336 |
| 4,445,445 | 5/1984 | Sterrett | 111/7 |
| 4,448,540 | 5/1984 | McLeod | 366/160 |
| 4,458,609 | 7/1984 | Tofte | 111/7 |
| 4,538,532 | 9/1985 | Coker | 111/7 |
| 4,548,982 | 10/1985 | Clark, Jr. et al. | 524/556 |
| 4,607,581 | 8/1986 | Kopecky | 111/73 |
| 4,627,338 | 12/1986 | Sprott et al. | 99/534 |
| 4,628,840 | 12/1986 | Jacobson | 111/7 |
| 4,674,419 | 6/1987 | Kopecky | 111/73 |
| 4,752,452 | 6/1988 | Harbolt et al. | 422/256 |
| 4,786,307 | 11/1988 | Marihart | 71/11 |
| 4,792,349 | 12/1988 | Trimm et al. | 71/31 |
| 4,900,339 | 2/1990 | Ward et al. | 55/204 |
| 5,041,632 | 8/1991 | Guglielmetti | 562/60 |
| 5,058,681 | 10/1991 | Reed | 166/303 |
| 5,114,694 | 5/1992 | Grotz, Jr. | 423/352 |
| 5,177,897 | 1/1993 | Patterson | 47/48.5 |
| 5,263,824 | 11/1993 | Waldbeser et al. | 417/10 |
| 5,290,527 | 3/1994 | Marquis et al. | 423/54 |
| 5,300,692 | 4/1994 | Sakamoto et al. | 564/405 |
| 5,336,790 | 8/1994 | Marquis et al. | 549/529 |
| 5,343,958 | 9/1994 | Kromminga et al. | 172/680 |
| 5,413,182 | 5/1995 | Kromminga et al. | 172/776 |
| 5,430,229 | 7/1995 | Voss | 588/202 |
| 5,452,673 | 9/1995 | Bruce | 111/119 |
| 5,567,887 | 10/1996 | Schleisman et al. | 73/863.12 |
| 5,574,657 | 11/1996 | Tofte et al. | 364/510 |
| 5,679,315 | 10/1997 | Neuman et al. | 423/339 |
| 5,826,522 | 10/1998 | Anders et al. | 111/119 |
| 5,845,592 | 12/1998 | Ridgley | 111/119 |
| 5,967,066 * | 10/1999 | Giles et al. | 111/119 |

* cited by examiner

METHOD AND APPARATUS FOR DELIVERING FERTILIZER TO THE SOIL

BACKGROUND OF THE INVENTION

1. Field of the Invention

The present invention relates to a new and improved method and apparatus for delivering fertilizer such as anhydrous ammonia to the soil through a plurality of knives penetrating the soil. More particularly, the invention relates to a system for controlling the flow of the anhydrous ammonia by controlling its temperature with an external refrigeration unit in cooperation with a heat exchanger through which the anhydrous ammonia passes and wherein its temperature is lowered by a refrigerated coolant also passing through the heat exchanger.

2. Description of the Relevant Art

Agricultural fertilizers are typically injected into the soil in a mixture of liquid and gaseous states through an apparatus that is pulled behind a motor driven tractor or the like, with the apparatus including a plurality of knife blades that penetrate the soil and have injection nozzles through which the fertilizer is injected or emitted into the soil. An ammonia storage tank is pulled behind the applicator and a hose connects the storage tank to a distribution system on the applicator, which directs the liquid and gaseous ammonia to the several knives on the applicator. It is, of course, desired that the ammonia fertilizer be applied uniformly over a field, but various factors can cause a lack of uniformity, depending upon the design of the applicator and the distribution system for the ammonia. The factors which affect the uniformity of the distribution of the ammonia over the field include ground speed, consistency of control of total flow from the storage tank, change of the ammonia temperature in the storage tank, partial depletion of ammonia in the storage tank, design of the distribution manifold system, the uniformity of flow paths to the knives, the effectiveness and consistency of flow control devices associated with the individual knives, and the interruption to flow of the knives such as might be caused by clogging at the outlet or nozzle of a knife.

Anhydrous ammonia in the storage tank is a saturated liquid at its vaporization temperature. As the liquid ammonia passes through a hose to the applicator, it experiences a pressure loss due to friction in the hose. Because of the lower pressure, some liquid ammonia vaporizes to cool the liquid to the vaporization temperature associated with that lower pressure. This drop in pressure changes the stream of ammonia into a mixture of liquid and gaseous phases. The greater the pressure drop, the greater is the ratio of gas to liquid. The mixture of liquid and gaseous phases has proven to be difficult to control, both as a total flow from the storage tank and when divided into the various lines leading to the plurality of knives carried by the apparatus. In spite of this problem, a majority of ammonia application systems in use continue to utilize systems wherein attempts are made to simultaneously control the liquid and gas phases.

The flow of ammonia through the system is generally controlled at three different locations. The total flow from the storage tank is controlled by a valve, pressure regulator, or metering pump at the end of the exit hose from the storage tank. The flow of ammonia to the individual knives on the apparatus is split at a manifold which divides the main flow of ammonia into a plurality of delivery hoses which are individually associated with a particular knife and its associated nozzle. The control of the flow of ammonia through the delivery hoses is typically accomplished by a restriction in the delivery line, which is normally an orifice of a predetermined diameter. Another point of control exists at the point where the ammonia exits the knife and is emitted into the soil. This control is again accomplished with an orifice or nozzle of a predetermined diameter. If the ammonia flowing through the system is never cooled, all control points (i.e., orifices, nozzles, valves, pumps or the like) change the ratio of gas to liquid and where control points reduce the pressure in the ammonia, the ratio of gas to liquid increases. A metering pump would have the opposite effect in that it would increase the pressure and thereby reduce the ratio of gas to liquid.

Distribution systems which attempt to avoid the mixed phases of ammonia have been devised and are commercially available. These systems typically divert a small portion of the liquid ammonia flowing from the storage tank and use it as a refrigerant to cool the main flow of the liquid from the storage tank to a temperature below its vaporization point. This is typically accomplished in a heat exchanger which mechanically separates the main stream into the smaller coolant stream and a resultant main stream.

There are two types of commercially available cooling systems for ammonia applicators. In the first system, the main stream of ammonia from the storage tank is cooled in a heat exchanger. A small side stream of liquid is diverted from the main stream after it has been cooled by the heat exchanger. This side stream is generally about 2% of the total stream. The side stream passes through a control valve and is reduced to a pressure close to atmospheric pressure. It becomes a stream of both gas and liquid at about −28° F. This cold stream cools the incoming main stream of ammonia passing through the heat exchanger, primarily by the complete evaporation of that part of the side stream which is still liquid. After the main stream of sub-cooled ammonia leaves the heat exchanger, it goes to a valve or pump which is able to control its flow. A single flow measuring device is often put in the line before the flow control device so that the total flow to the injector knives can be monitored. Following the flow control and measuring devices, the main ammonia stream is split into several streams by a manifold with each of the several streams being delivered to one of the injector knives. Depending on the flow control device, ammonia leaving it may be in a mixed gas/liquid state before reaching the manifold. After the manifold, a device acting as an orifice is located in each delivery line to the knives to control the flow of ammonia to the knives. This orifice causes a large enough pressure drop so that the ammonia stream flashes into a mix of gas and liquid phases before reaching a knife. Ammonia vapor from the coolant side of the heat exchanger is typically split into two streams and these streams are individually sent to two of the injector knives in the system. The crop rows supplied by the knives receiving the split streams receive a somewhat higher amount of ammonia, resulting in a row-to-row variation of about 12%. Because all of the ammonia in the side streams leaves the heat exchanger as a vapor, any solid undissolved in the ammonia may be left in the heat exchanger. This could result in plugging of the cooling side of the exchanger caused by the deposit of solids dissolved in the ammonia.

In the second commercially available system, the main stream of ammonia from the storage tank is again cooled in a heat exchanger. After being cooled in the heat exchanger, the main stream of sub-cooled ammonia leaves the heat exchanger and goes through a valve or pump which is able to control its flow. A single flow measuring device is often put in the line just before the flow control device so that the total flow to the injector knives can be monitored. Following the flow control and measuring devices, the ammonia is split into several streams by a manifold with each of the streams passing to one of the individual injector knives on the apparatus. Depending on the flow control device, ammonia leaving it may be in a mixed gas/liquid state before reaching the manifold. After the manifold, a device acting as an orifice is located in each delivery line to the knives to provide controlled flow to each knife. This orifice causes a large enough pressure drop so that the ammonia stream flashes into a mix of gas and liquid phases before reaching a knife. Two of the several delivery lines pass through the heat exchanger before going to the knives. Liquid ammonia in these two lines cools the incoming main stream by additional partial evaporation. This results in a higher ratio of gas to liquid for those two lines compared to the lines which go directly to the knives and do not pass through the heat exchanger. The increased amount of gas reduces flow through the two lines because a given amount of gas causes a greater pressure drop than the same amount of liquid. The reduction of flow through the two lines used as coolant can be 10% or more. One advantage with this second commercially available system is that there is no potential for plugging by a solid dissolved in the ammonia because the liquid ammonia in the streams holds the solids in solution until exiting the knives.

As will be appreciated, neither of the aforedescribed commercially available systems uniformly delivers the ammonia to the soil through each of the knives and, accordingly, a system for improving the uniformity of the delivery of the ammonia would be well received in the agricultural community.

SUMMARY OF THE INVENTION

The method and apparatus of the present invention utilizes a delivery system including a plurality of knives which cut the soil and deliver ammonia through injection nozzles and where the ammonia is again carried in a storage tank that is pulled behind the applicator. The system also uses a heat exchanger to control the temperature of the anhydrous ammonia, but the coolant for the heat exchanger comes from an external refrigeration unit. The method and apparatus of the present invention thereby avoids the problem of controlling anhydrous ammonia in the mixed gas and liquid phases through the distribution manifold. The ammonia passes through the applicator system as a liquid to the locations where flow is controlled, which is the distribution manifold, and flow is controlled as in prior systems by valves, metering pumps, orifices, or the like.

Ammonia from a supply tank passes through a hose which is connected to the heat exchanger. Friction in the hose creates a small pressure drop which generates a small amount of gas in the ammonia stream before it enters the heat exchanger. As the ammonia passes through the heat exchanger, it is cooled by the refrigerated coolant associated with the external refrigeration unit. Any ammonia in a gaseous phase is condensed back to liquid in the heat exchanger. The liquid ammonia is sub-cooled to a temperature well below its boiling point. The ammonia stream can then be controlled as a liquid with no gas interference. The ammonia remains a liquid until it passes through all flow control locations associated with the individual knives.

The present invention provides two options for delivering the ammonia to the soil, with the options being dependent upon the temperature to which the ammonia is cooled in the heat exchanger, as will be more clear from the detailed description that follows.

Other aspects, features and details of the present invention can be more completely understood by reference to the following detailed description of a preferred embodiment, taken in conjunction with the drawings and from the appended claims.

DESCRIPTION OF THE PREFERRED EMBODIMENTS

Figures 1, 2:
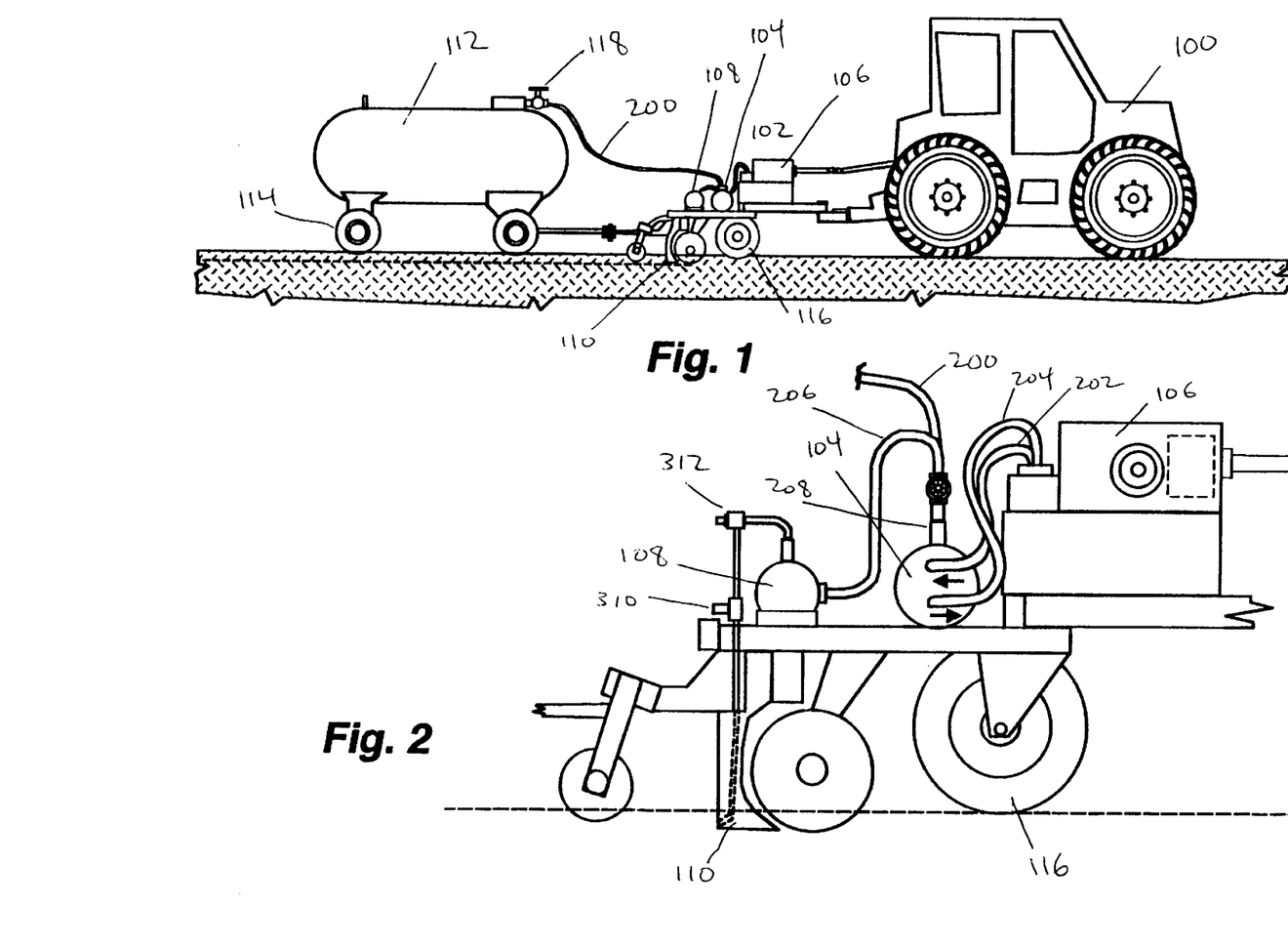
FIG. 1 is a side elevation of the apparatus of the present invention being pulled behind a tow vehicle.
FIG. 2 is a fragmentary side elevation of the apparatus of the present invention.

Referring first to FIG. 1, the apparatus of the present invention is shown being pulled behind a tow vehicle 100 which could be a tractor, truck, or the like. The apparatus includes a toolbar applicator frame 102 which supports a heat exchanger 104, an externally powered refrigeration unit 106, a distribution manifold 108, a plurality of soil cutting knives 110, and a storage tank 112 supported on a plurality of wheels 114 and towed behind the toolbar applicator frame 102. The toolbar applicator frame 102 itself is supported on a plurality of wheels 116 and has a tongue that is pivotally connected to a hitch on the rear of the tow vehicle 100. In the preferred embodiment, the toolbar applicator frame 102 is a Progressive Series 1300 NH3 Toolbar, manufactured by Progressive Farm Products, Inc. of Hudson, IL. It is configured by Progressive for "strip till" ammonia application. Multiple knives 110 are suspended from the frame, with there being typically 8, 12, or 16 of the knives 110 attached to a toolbar applicator frame 102, which is adapted to raise or lower the knives 110 into the soil. Each knife 110 includes at least one injector nozzle through which the ammonia can be emitted into the soil when the knife 110 is lowered into the soil.

The supply tank 112 is a pressurized tank that is commercially available and retains a predetermined quantity of fertilizer which may be, by way of illustration, anhydrous ammonia. The supply tank 112 is on a trailer that also has a tongue that is pivotally connected to a hitch on the toolbar applicator frame 102.

Figure 3:
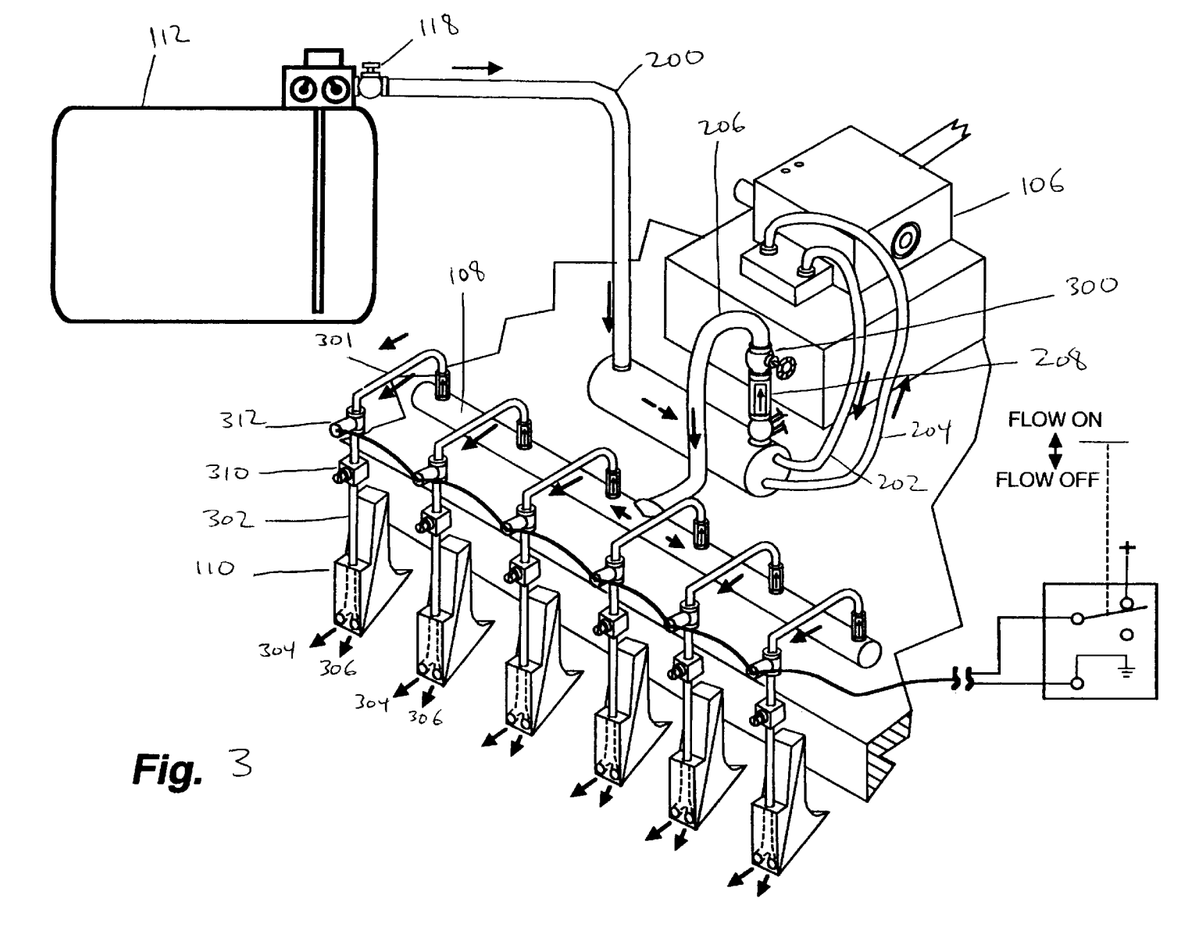
FIG. 3 is an isometric diagrammatic view of portions of the apparatus of the present invention showing the flow of fluids through the system.
Figure 4:
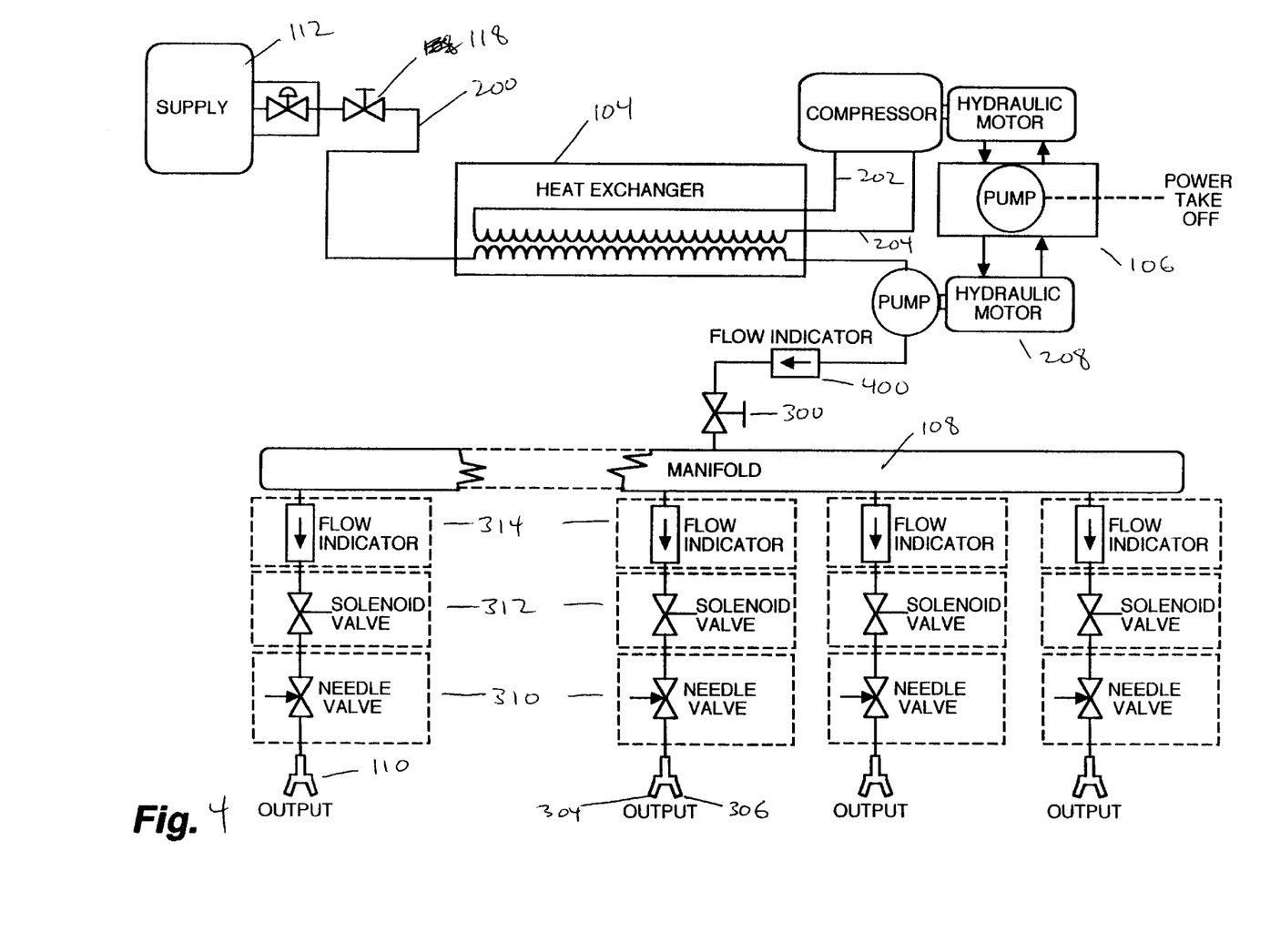
FIG. 4 is a schematic view of portions of the apparatus of the present invention showing the flow of fluids through the system.

FIGS. 1–6 depict the apparatus of the present invention. As shown clearly in FIG. 2, a main delivery or exit hose 200 passes from the supply tank to the toolbar applicator frame 102 and an appropriate manually-operable shut-off valve 118 (shown, for example, in FIG. 1) is provided in the main delivery hose 200. The main delivery hose 200 would be, by way of example, a 1.25" internal diameter ("I.D.") reinforced neoprene-lined hose and is connected at its opposite end to the inlet end of the heat exchanger 104. The heat exchanger 104 could be, by way of example, a size 3-Y-72 MFVHT-4-C-SS Type "BEM" DX cooler manufactured by API Ketema, of Grand Prairie, Tex. The ammonia flows through the heat exchanger 104 where it is cooled below its boiling point by the separately powered refrigeration system 106. The refrigeration system 106 has a compressor powered by a hydraulic pump installed on the tow vehicle 100. The coolant from the refrigeration system 106 passes through an inlet line 202 into the heat exchanger 104 and subsequently back to the refrigeration system 106 through an outlet line 204, as best seen in FIGS. 3–4.

The ammonia leaving the heat exchanger 104 passes through a second exit hose 206 which might be, for example, a one inch I.D. reinforced neoprene-lined hose, to a flow control device 208 (depicted in FIGS. 2, 3, and 4) which regulates the rate of flow of the ammonia. The flow control device 208 would preferably be a positive displacement pump, such as of the type manufactured under model 1700 by Hypro Corporation of New Brighton, Minn. In the preferred embodiment, the pump is driven by a Char-Lynn hydraulic motor, model 103-1042-010, using tractor hydraulics. A flow sensor 400 (depicted in FIG. 4) is provided in the second exit hose 206 downstream from the flow control device 208, with the flow sensor 400 being operably connected to a read-out unit in the cab of the tow vehicle 100 so that the operator of the tow vehicle 100 can monitor the flow of ammonia through the second exit hose 206. Downstream from the flow sensor 400 in the second exit hose 206 is a hydraulically operated shut-off valve 300 that is also controlled from the cab of the tow vehicle 100 so that the operator of the tow vehicle 100 can selectively shut off the flow of ammonia. Downstream from the shut-off valve 300, the second exit hose 206 is connected to a distribution manifold 108 that extends transversely of the toolbar applicator frame 102. The distribution manifold 108 has connected thereto at predetermined locations along its length a plurality of distribution hoses 301, 302 which are connected at their opposite ends to the emitting nozzles 304, 306 of an associated knife blade 110. The nozzles 304, 306 associated with each knife blade 110 are in effect orifices of a predetermined size that control the flow of ammonia therethrough.

The apparatus of the present invention can be used in two different formats or options. In both formats, the ammonia remains liquid until it passes through the distribution manifold 108. By retaining liquid throughout the distribution manifold 108, the problems encountered in the prior art in handling a combined liquid/gas state are overcome, and a uniform distribution of ammonia to each distribution hose 301, 302, and thus each knife blade 110, is obtained. Additionally, because cooling ammonia is not distributed through the knife blades 110, and is instead wholly contained in the externally powered refrigeration unit 106, fluctuations in ammonia delivery are again eliminated. Prior art systems used the cooling ammonia (in a liquid/gas state) as ammonia delivered through the knife blades, which resulted in an uneven distribution. As will be described in detail below, the two formats of the present invention structurally differ only in locations downstream from the distribution manifold 108.

In the first format (shown in FIGS. 1–4), visual flow meters 314 may be installed upstream from the solenoid valve 312 and the control orifice 310 in each line from the distribution manifold 108 so that integrity of the line and amount of flow in each line can be verified. The high pressure distribution hose 301 extends from the distribution manifold 108 to the solenoid valves 312. Just after the flow meter 314 is the solenoid valve 312 which turns flow off and on to the knife 110. Control orifices 310 (shown in FIGS. 3–4) of a predetermined size would be positioned at a location after the solenoid valves 312. The control orifices 310 are sized to determine the desired flow through each distribution hose 302. Depending on expected operating conditions, the control orifices 310 would typically range between 0.050"0 and 0.1" in diameter. Typically, the low-pressure distribution hoses 302 could be flexible unreinforced 0.375" I.D. hose from the control orifice 310 to the knife 110 since the pressure in each distribution hose 302 is very low because of the pressure loss associated with each control orifice 310. Due to the control orifices 310, ammonia might partially vaporize as it leaves the distribution manifold 108 and the ammonia may therefore be considerably cooled by this vaporization. In practicing the present invention in accordance with the first option, the temperature of the ammonia would be reduced in the heat exchanger by approximately five degrees Fahrenheit below the temperature of the ammonia in the storage tank 112.

The temperature in the storage tank 112 varies with operating conditions, particularly atmospheric temperature. The storage tank temperature is usually close to atmospheric temperature, but can vary under certain conditions, such as when storage tank 112 is receiving direct sunlight. Ammonia is usually delivered into the soil when the atmospheric conditions are between just below freezing (approximately 25 degrees Fahrenheit) and about 80 degrees Fahrenheit.

Orifice sizes may vary due to changes in the desired application rate and changes in ammonia temperature in the storage tank 112. An alternative to an orifice is a conventional needle valve with a stepped valve plug. This design of valve allows setting of ammonia flow in discrete steps, based on the number of turns made on the valve. For example, a needle valve can be used as the control orifice 310, as depicted in FIGS. 4 and 5, to control the flow of ammonia in discrete steps.

Figure 5:
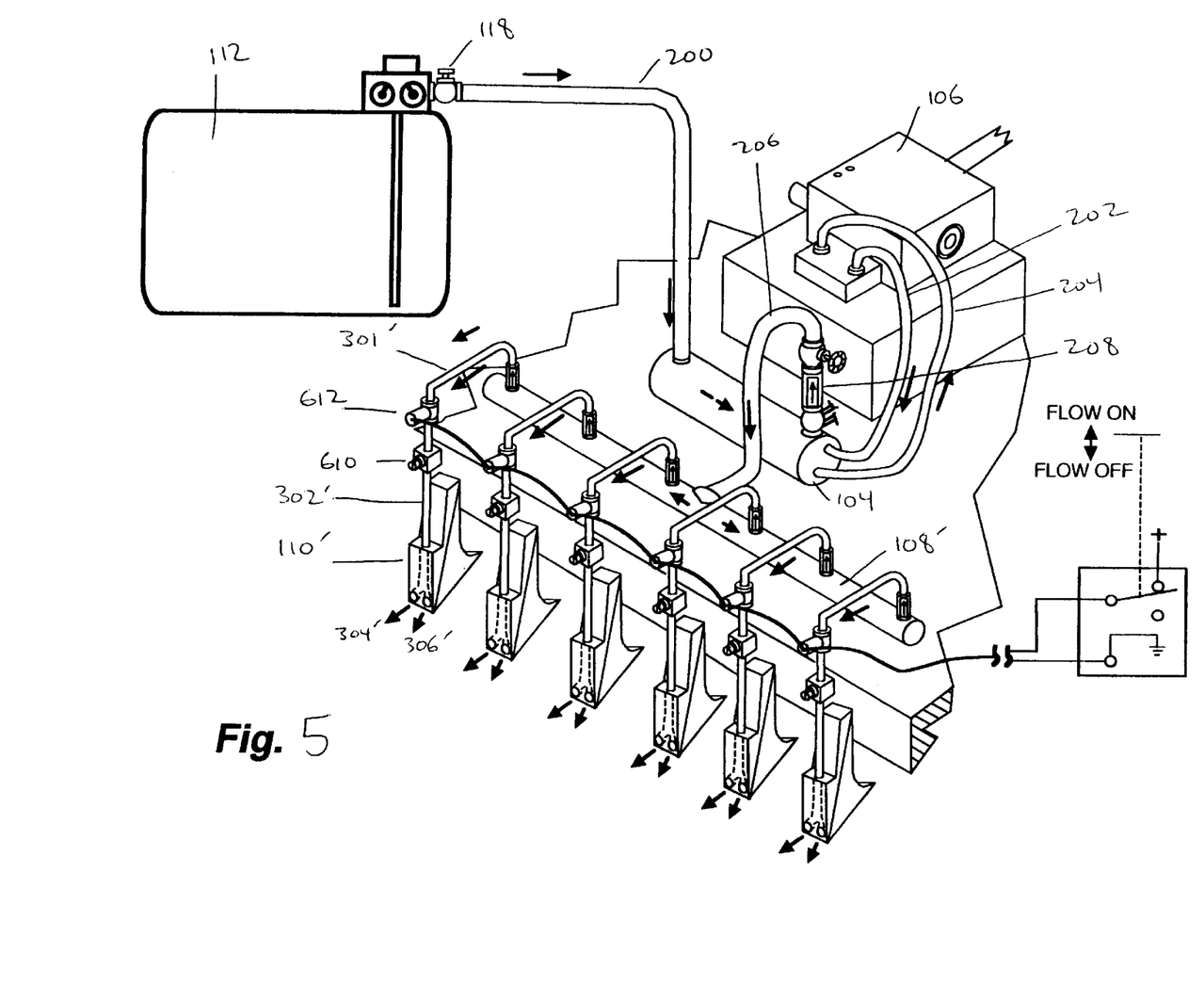
FIG. 5 is an isometric diagrammatic view of portions of the apparatus of the present invention in an alternative embodiment showing the flow of fluids through the system.
Figure 6:
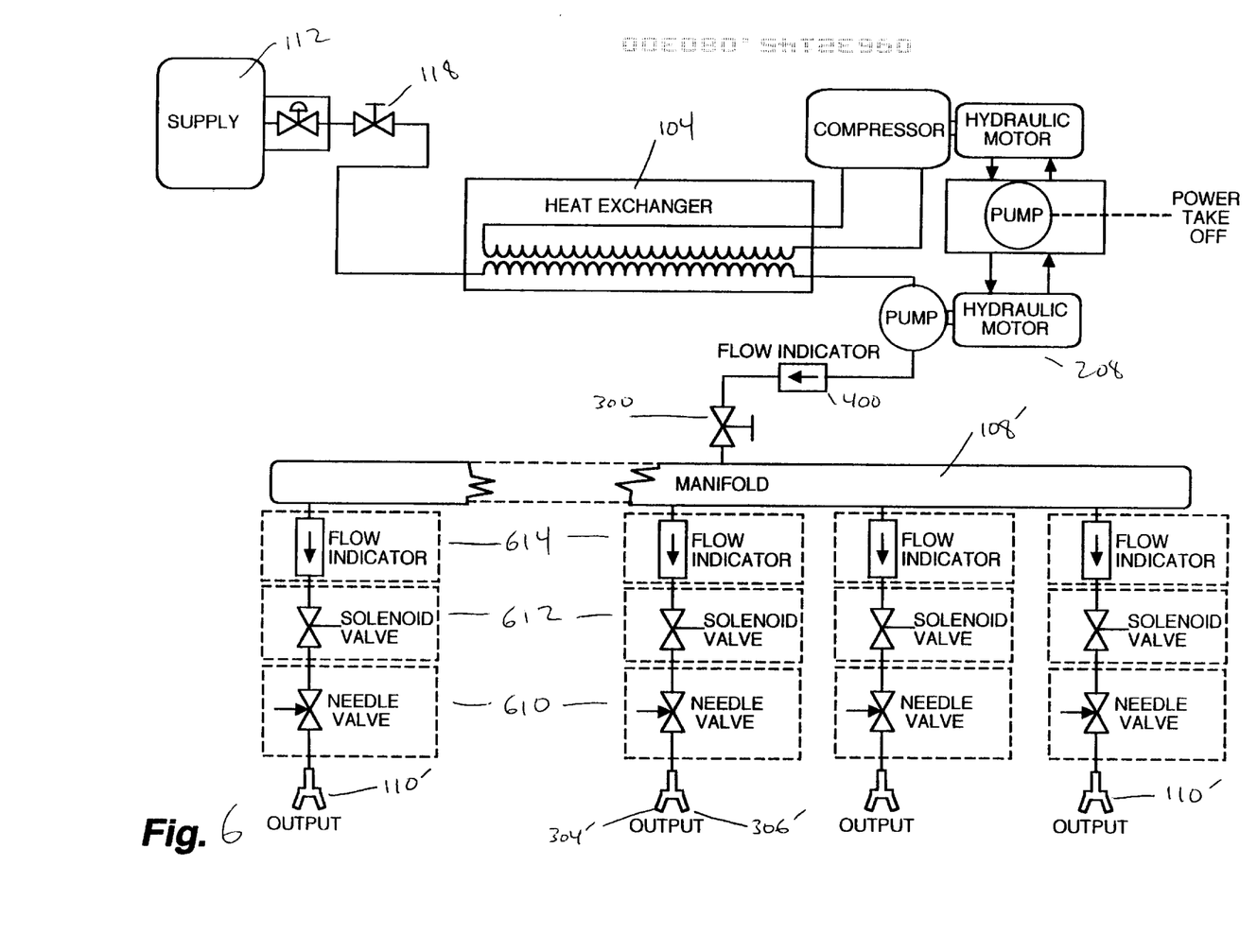
FIG. 6 is a schematic view of portions of the apparatus of the present invention in an alternative embodiment showing the flow of fluids through the system.
Figure 7:
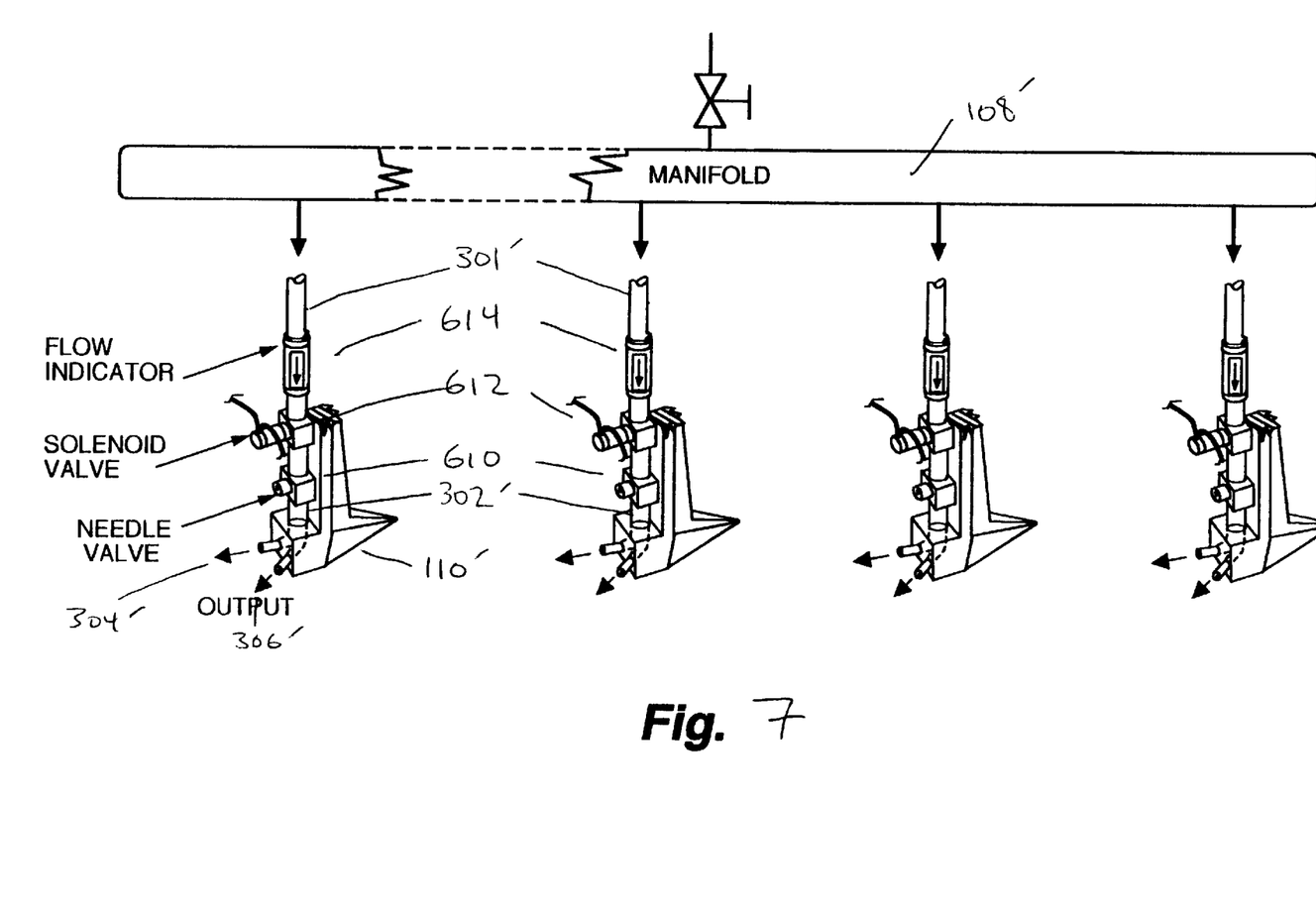
FIG. 7 is an isometric view of portions of the apparatus of the present invention showing the knife blades.

In accordance with the second format or option, as shown in FIGS. 5–7, the system would be operated so that ammonia would remain in a liquid state until it reaches the end of the knives 110'. Except as described below, the second format is the same as the first format, and like parts receive like numbers. The second format and first format only differ downstream from the distribution manifold 108, so like numbers are used for the manifold and upstream items. Like parts on downstream items have like reference numerals with a prime suffix. Preferably in this second format, there would be two orifices or nozzles 304', 306' at each knife 110', with the orifices having a diameter of approximately 0.1" at the end of a 0.375" I.D. steel tube. However, in this format, the controlling orifice 310' and solenoid valve 312' are not located adjacent to the distribution manifold 108' but instead are located immediately upstream from the knife 110' in the distribution line 302'. Just before each knife 110' and before the controlling orifice 310' is the solenoid valve 312' which turns flow off and on to that knife 110'. Downstream from the solenoid valve 312' but immediately upstream from the knife 110', is the controlling orifice 310', which typically ranges between 0.065" and 0.125" in diameter. Further, visual flow meters 314' (shown in FIG. 6) might be installed in each of the distribution hoses 301' from the distribution manifold 108 upstream of the controlling orifice 310' so that the integrity and amount of flow in each line could be verified. While practicing the invention in accordance with the second format or option, the temperature of the ammonia would be reduced in the heat exchanger by approximately five degrees Fahrenheit below the temperature of the ammonia in the storage tank 112. The second format or option results in the ammonia being warmer because of its liquid state throughout the system. The knife 110', therefore, is not subject to clogging problems associated with cold knife blades.

Use of orifices to control flow causes a problem with ammonia being released into the air. In both options of the present invention, for example, between the hydraulically operated shut off valve 300 and the injection knives 110 there is a significant volume of ammonia. Without orifices, after closing the shut off valve 300 this ammonia would flow very quickly to the ground before the toolbar is raised at the end of a row as there is no significant restriction trapping it. The orifices provide enough restriction so that ammonia could be released over a period of many seconds, about the time for the equipment to make its turn. This would result in a cloud of ammonia and ice crystals which are both unsightly and dangerous to anyone standing nearby. To prevent this situation in the present invention, normally open solenoid valves 312, 312' are placed just upstream from the orifices 304, 304', 306, 306'. These solenoid valves 312, 312' are closed by a switch in the cab of the tow vehicle 100 at the end of a row before the toolbar is lifted. This reduces ammonia available for escape to the atmosphere to a minimal amount. At the start of a new row, the system has not been depleted of liquid ammonia, so it requires much less time to reach equilibrium at the start of a new row.

It will be appreciated from the above that, through the use of an external refrigeration unit 106, the temperature of the ammonia can be controlled so that the system for delivering ammonia or other fertilizers does not need to concern itself with liquid and gas phases when the fertilizer is controlled which detrimentally affect the uniformity of the application of the fertilizer and, accordingly, a uniform distribution of the fertilizer across the width of the apparatus and through each individual nozzle can be accomplished.

Although the present invention has been described with a certain degree of particularity, it is understood that the present disclosure has been made by way of example and changes in detail or structure may be made without departing from the spirit of the invention as defined in the appended claims.

What is claimed is:

1. An agricultural fertilizer applicator comprising in combination:
    a frame mounted on wheels for movement across an agricultural field, said frame including a plurality of soil cutting knives for penetrating the soil, each knife having at least one fertilizer emitting nozzle through which fertilizer can be emitted into the adjacent soil,
    a fertilizer supply tank operably connected to said frame for maintaining a supply of liquid fertilizer and a first exit hose from said tank,
    a heat exchanger operably connected to said frame and to said first exit hose such that fertilizer can flow from said tank through said heat exchanger,
    a second exit hose for carrying fertilizer from said heat exchanger,
    an independently powered refrigeration unit operably connected to said heat exchanger for circulating coolant through said heat exchanger, and
    a plurality of delivery hoses operably connecting said second exit hose to each nozzle on said soil cutting knives.

2. The applicator of claim 1 further including a manifold connected to said second exit hose and wherein said manifold is operably connected to said delivery hoses.

3. The applicator of claim 1 wherein said fertilizer is anhydrous ammonia.

4. The applicator of claim 1 further including a shut-off valve operably associated with said first exit hose.

5. The applicator of claim 1 further including a flow regulator device operably associated with said second exit hose.

6. The applicator of claim 5 wherein said flow regulator device is a positive displacement pump.

7. The applicator of claim 5 further including a sensor operably associated with said flow regulator device for sensing flow information.

8. The applicator of claim 7 further including a shut-off valve operably associated with said second exit hose.

9. The applicator of claim 1 further including orifice devices operatively associated with each delivery hose, said orifice devices having passages therethrough of a predetermined diameter.

10. The applicator of claim 9 further including shut-off valves operably associated with each orifice device.

11. The applicator of claim 9 further including a second orifice device associated with each delivery hose, said second orifice device being positioned immediately upstream from said two nozzles and having a passageway therethrough of a predetermined diameter.

12. The applicator of claim 1 further including needle valves operatively associated with each delivery hose, said needle valves having passages therethrough consisting of a stepped valve plug.

13. The applicator of claim 12 further including shut-off valves operably associated with each needle valve.

14. The applicator of claim 1 wherein there are two nozzles on each soil cutting knife.

15. The applicator of claim 1, further including at least one visual flow meter in each of said delivery hoses.

16. The applicator of claim 1, wherein said independently powered refrigeration unit cools said fertilizer to a temperature of approximately five degrees Fahrenheit below the temperature in the storage tank.

17. The applicator of claim 1, wherein said independently powered refrigeration unit cools said fertilizer to a temperature low enough that the fertilizer remains in a liquid state until it exits said nozzles.

18. A method of delivering anhydrous ammonia to soil comprising the steps of:
    providing a frame with wheels for movement across said soil and with a plurality of soil cutting knife blades having at least one fluid delivery nozzle thereon,
    providing a supply tank of said anhydrous ammonia and means for moving it across said soil with said frame,
    providing a heat exchanger and a first exit hose from said supply tank to said heat exchanger,
    providing an independently powered refrigeration unit and a system for circulating refrigerated coolant from said refrigeration unit through said heat exchanger to cool anhydrous ammonia passing therethrough,
    providing a second exit hose from said heat exchanger,
    providing a plurality of delivery hoses from said second exit hose to said nozzles, and
    cooling said anhydrous ammonia in said heat exchanger to a low enough temperature such that it will remain in a liquid phase until emitted through said nozzles into said unit.

19. The method of claim 18 further including providing a manifold connected to said second exit hose and wherein said manifold is operably connected to said delivery hoses.

20. The method of claim 18, further comprising the steps of:
providing shut-off valves downstream of said nozzles, and
closing said shut-off valves after delivering a portion of said anhydrous ammonia to prevent release of said anhydrous ammonia into the air.

21. A method of delivering anhydrous ammonia to soil comprising the steps of:
providing a frame with wheels for movement across said soil and with a plurality of soil cutting knife blades having at least one fluid delivery nozzle thereon,
providing a supply tank of said anhydrous ammonia and means for moving it across said soil with said frame,
providing a heat exchanger and a first exit hose from said supply tank to said heat exchanger,
providing an independently powered refrigeration unit and a system for circulating refrigerated coolant from said refrigeration unit through said heat exchanger to cool anhydrous ammonia passing therethrough,
providing a second exit hose for carrying fertilizer from said heat exchanger,
providing a plurality of delivery hoses from said second exit hose to said nozzles,
providing orifice devices in each of said delivery hoses with passageways therethrough of a predetermined diameter, and
cooling said anhydrous ammonia in said heat exchanger to a temperature such that the anhydrous ammonia is connected to mixed phases of liquid and gas as it flows through said orifice devices.

22. The method of claim 21, further comprising the step of providing a manifold connected to said second exit hose and wherein said manifold is operably connected to said delivery hoses.

23. The method of claim 21, further comprising the steps of:
providing shut-off valves downstream of said nozzles, and
closing said shut-off valves after delivering a portion of said anhydrous ammonia to prevent release of said anhydrous ammonia into the air.

* * * * *